July 7, 1936. K. R. MANVILLE 2,046,957
SYNCHRONIZING MECHANISM
Filed May 18, 1935 2 Sheets-Sheet 1

INVENTOR.
Keith R. Manville,
BY
HIS ATTORNEYS

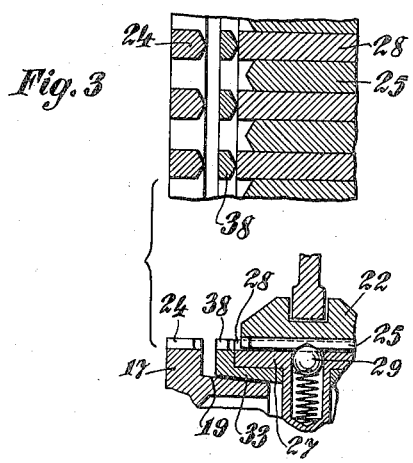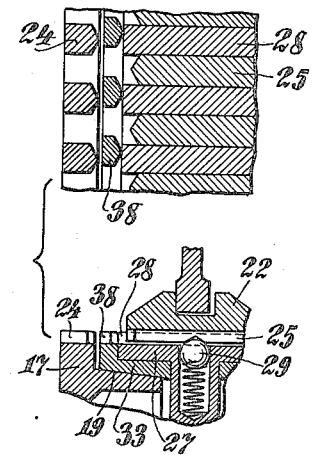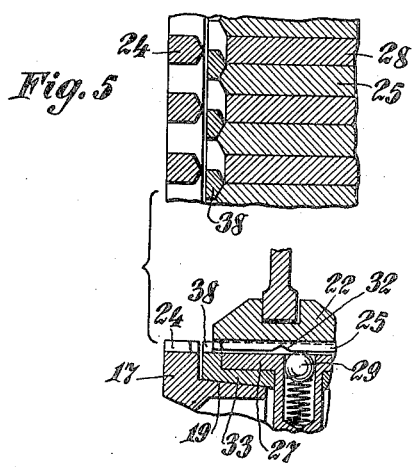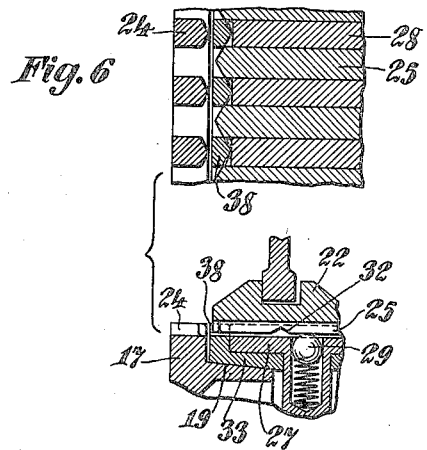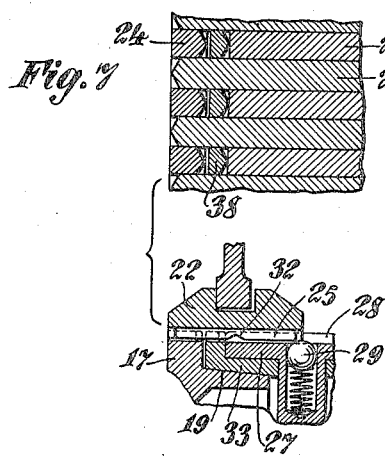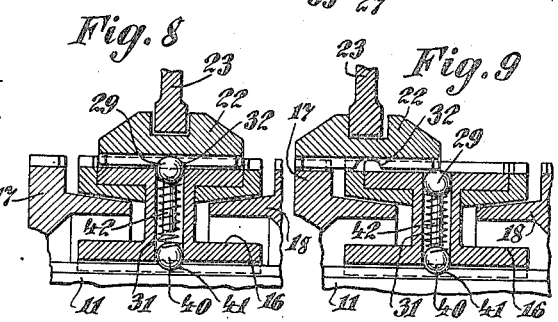

Patented July 7, 1936

2,046,957

UNITED STATES PATENT OFFICE 2,046,957

SYNCHRONIZING MECHANISM

Keith R. Manville, Highland Park, N. J., assignor to International Motor Company, New York, N. Y., a corporation of Delaware Application May 18, 1935, Serial No. 22,214

2 Claims. (Cl. 192—53)

The present invention relates to devices for synchronizing the speed of rotation of two relatively movable elements which are adapted to be connected and disconnected and embodies, more specifically, an improved construction by means of which relatively movable clutch elements may be brought into synchronization prior to engagement thereof, thus insuring ease and quietness of operation, as well as speed in effecting the same.

The trend of motor vehicle design now favors transmission mechanisms of the type wherein constant mesh gears are used. Certain of these gears are rotatable upon the shafts on which they are mounted and in order to connect predetermined pairs of the gears in driving relationship with respect to the driving and driven shafts, clutches are provided to clutch such rotatable gears to the shafts. When a difference in speed exists between the clutch elements, there naturally exists a difficulty in bringing the elements into engagement. Various forms of mechanisms have been provided to facilitate this operation and the present invention embodies an improved structure for accomplishing quiet shifting and engagement of the clutch elements and also for expediting the shifting operation.

An object of the invention, accordingly, is to provide a synchronizing mechanism by means of which relatively movable elements may be engaged and disengaged without noise or clash and without the exercise of any timing judgment on the part of the operator.

A further object of the invention is to provide a mechanism of the above character wherein the relatively movable elements to be engaged and disengaged are automatically brought into synchronism upon the initial shifting operation and subsequently properly aligned before actual engagement takes place in order that the engaging operation may be effected without the exercise of any judgment on the part of the operator during the shifting operation.

Further objects, not specifically enumerated above, will be apparent as the invention is described in greater detail in connection with the accompanying drawings, wherein:

Figures 3 to 7 are a series of segmental views in section showing the synchronizing and aligning elements and the manner in which these elements function during the engaging operation of the clutch elements.

Figures 8 and 9 are views in sections, similar to Figure 1, but in reduced scale, showing a modified form of the invention wherein means is provided to prevent incidental use of one side of the synchronizing device while disengaging the other side.

Figure 1:
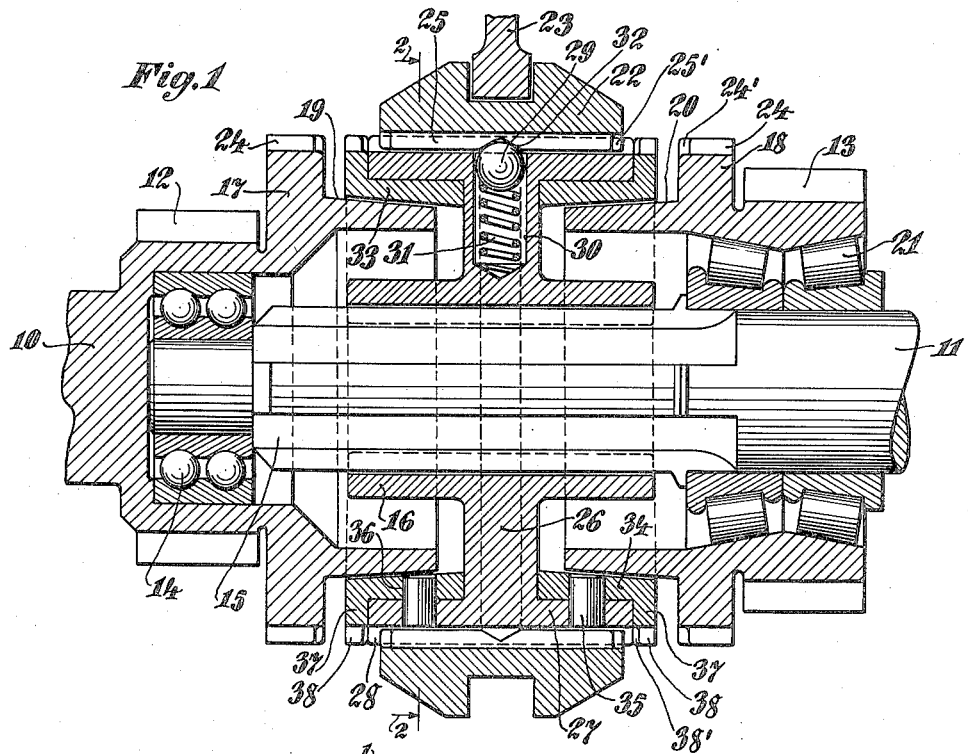
Figure 1 is a view in section, taken through the axis of a clutch mechanism provided with a synchronizing device constructed in accordance with the present invention.
Figure 2:
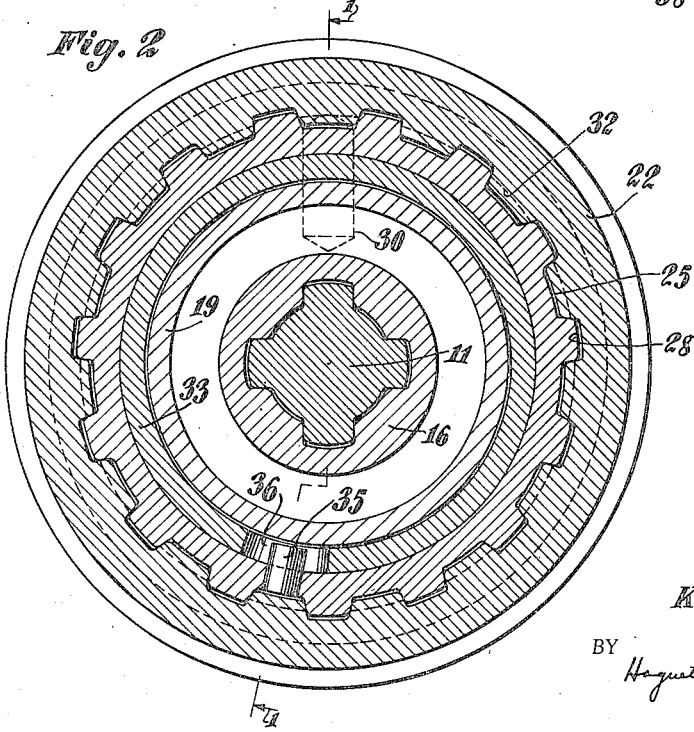
Figure 2 is a view in section, taken on line 2—2 of Figure 1, and looking in the direction of the arrows.

With reference to the above drawings, driving and driven shafts are shown at 10 and 11, each being provided with gears 12 and 13, respectively. Shaft 11 may be journaled concentrically with respect to shaft 10 and within the gear 12 by means of a suitable bearing 14 and is provided with keys or splines 15 upon which a collar 16 is splined for sliding motion.

Gear 12 is formed with a flange 17 and gear 13 with a flange 18, the flanges 17 and 18 being formed with conically shaped friction members 19 and 20, respectively.

Gear 13 is journaled upon shaft 11 by means of bearings 21 and the gears 12 and 13 are connected to shaft 11 for transmission of driving forces by means of a sleeve 22 which is operated by a fork 23. The flanges 17 and 18 are formed with external teeth 24 while the sleeve 22 is formed with internal teeth 25 which correspond in number and formation to the spaces between teeth 24, whereby the sleeve 22 may be slid into engagement with the teeth on either of the flanges 17 and 18.

Collar 16 is formed with a web 26 and a shell 27 upon which external teeth 28 are formed, corresponding in size and number to the teeth 24. Sleeve 22 is thus slidably but non-rotatably mounted upon the shell and correspondingly is slidably but non-rotatably mounted upon shaft 11.

In order that the initial motion of the sleeve 22 toward either of the flanges 17 and 18 may produce a synchronizing action, the shell 27 and collar 16 are carried with the sleeve 22 during such initial motion. This is accomplished by means of a ball check 29 which is received within a well 30, formed within the web 26. A spring 31 urges the ball outwardly and into a notched groove 32, formed on the interior surface of the sleeve 22. The initial motion of the sleeve 22 thus moves the shell 27 therewith and causes the corresponding male conical member 19 or 20 to be engaged by respective friction rings 33 and 34 which are formed with female conical surfaces similar to the surfaces of 19 and 20. Pins 35 prevent relative axial motion between the shell 27 and the members 33 and 34, these pins being received in elongated recesses 36 which permit a degree of rotative motion to take place between the respective rings 33 and 34 and the shell 27. The outer ends of the rings 33 and 34 are formed with flanges 37 having teeth 38 corresponding in number and size to the teeth 24.

In order to facilitate the alignment of the engaging teeth on the clutch members, the ends of the teeth 25 on the sleeve 22 are tapered as indicated at 25'. The ends of the teeth 38 on the flanges 37 adjacent the sleeve 22 are also tapered as indicated at 38'. Moreover, the adjacent ends of the teeth 24 are tapered as indicated at 24'. From an inspection of Figure 3, it will be seen that the segmental portion illustrates the elements in neutral position wherein the teeth 25 lie wholly within the space between the ends of the teeth 28. As shown in Figure 1, the clutch rings 33 and 34, in this position, are disengaged from the members 19 and 20. Upon initial movement of the sleeve 22 toward either one of the flanges 17 or 18 (for example, toward flange 17) the ball check 29 carries the shell 27 and friction ring 33 into engagement with the friction surface of the member 19. Upon engagement of these members the relative rotation between the members 17 and 22 is arrested and the ring 33 is displaced rotatively with respect to the shell 27 to the limit of the slot 36. This condition is illustrated by the segmental view of Figure 4.

The axial motion between flange 17 and shell 27 is arrested, the ball check 29 is displaced from the groove 32 and the sleeve 22 moves axially with respect to the shell 27, causing the tapered portions 25' to engage the tapered portions 38'. Braking force is now exerted between the members 33 and 19 and the parts now assume the position as illustrated in Figure 5.

Continued motion of the sleeve 22 brings the members 17 and 22 to the same speed and the sleeve 22 replaces the ring 33, causing the drag between the members to cease. This is illustrated in Figure 6.

Complete engagement is further effected by further motion of the sleeve 22 until the teeth 25 engage between the teeth 24 as illustrated in Figure 7.

As above noted, friction between the conical surfaces causes the ring 33 to be carried for a distance limited by the peripheral clearance between the pin 34 and the corresponding slot 36. In this fashion, the ring is displaced with respect to shell 27 by friction. The pins 35 are located in definite relation to the teeth on the shell 27 and the centers of the slots 36 have the same definite relation to the teeth. Axially the slots have a diameter equal to that of the pins 35 but peripherally, the diameter thereof is sufficiently greater to allow rotary motion to take place between the rings and the shell to such an extent that the teeth thereon instead of exactly lining up with those of the shell as in the central position of the slot, stand opposite the spaces between the teeth of the shell. In this displaced position the teeth of the rings stand in the way of the teeth in the sleeve 22 and prevent them from passing beyond the edge of the collar. Further pressure on the collar from the fork now serves to press the female conical surface of the members 19 or 20, producing friction between these surfaces which brings them to the same rotative speed. When this condition is reached, the friction which has held the ring in the displaced position ceases and the pressure exerted by the shell moves the ring back toward its central position on account of the screw effect of the chamfers or tapers on the adjacent ends of the teeth. As soon as the teeth of the ring no longer block the teeth of the shell, the shell can move beyond the edge of the sleeve and enter the teeth 24, thus completing engagement of the clutch.

In this fashion, the mechanism not only brings the mating parts to the same rotative speed before engagement thereof but also prevents premature engagement and frees the operator from the necessity of exercising any judgment as to how long to allow for the process to be completed. He merely exerts pressure continuously and the engagement takes place at the correct moment automatically.

The teeth 28 require no chamfering or tapering. The taper or chamfer on the teeth 24, 25, and 38 must be sharp or pointed to obviate the possibility of having surfaces at right angles to the axis of the mechanism meeting when the teeth 25 proceed into engagement and further to permit the rings 33 and 34 to be rotated by the endwise motion of the sleeve 22 after the rotary drag thereon (due to the friction while the conical friction members are turning at different speeds) has ceased. The general angle of this chamfer is critical, in that it must be such as to permit the aforesaid rotary motion but at the same time must not result in a rotary force sufficient to overcome the drag during the period of bringing the members which are about to be engaged to the same speed. This must be true, otherwise the sleeve 22 might not be detained by the teeth 38 during this period and might engage the teeth 24 at a time when there is a difference in speed resulting in clashing of the teeth 24 and 25. A suitable angle for the chamfer of teeth 24, 25 and 38 is 30 degrees, such angle having been used in a device in which the invention has been embodied and which has operated entirely satisfactorily. It is believed, however, that angles up to 35 degrees would function properly although, above 35 degrees, it is possible that the resulting structure would fail to "balk" and would result in greater delicacy of the points of the teeth.

The included angle or taper of the conical surfaces is also critical in that it will provide the maximum of braking power and still be such that the coacting members may release without sticking. A suitable taper for the faces of the friction clutch members has been found to be 12 degrees for the included angle and this taper has operated satisfactorily in a device in which the invention has been embodied. It is believed, however, that angles of from 11 degrees up will function properly although angles of 11 degrees may be slightly inclined to stick at times and will also require slightly more longitudinal travel. Increasing this angle detracts from the braking efficiency of the cones. It is to be noted that the length of time needed to bring the members to be engaged to the same speed is very short in the case of an ordinary vehicle transmission when the clutch connecting the transmission and motor is disengaged. In fact, the rapidity with which a change of ratio may be made is the chief advantage of this system, enabling faster pick up and faster schedules due to less time lost in neutral when shifting. It is probable that a shift normally requiring three seconds can be made in ⅖ of a second by means of the foregoing mechanism. Moreover, the mechanism is compact and requires little or no additional length in the gear box. The mechanism is simple, rugged and may be manufactured at comparatively low cost.

In the construction shown in Figures 8 and 9, a form of synchronizing device is shown wherein means is provided for preventing incidental use of one side of the device while disengaging the other side, thus prolonging the life of the associated parts. In this form of the invention, the spring 31 which urges the ball check 29 against the element 22 to engage the groove 32 when in a neutral position also engages, at its other end, a ball check 40 which is urged against the spline shaft 11 and, in a neutral position of the elements, into a groove 41 formed in the spline shaft. A cylindrical spacer 42 effects a solid contact between the balls 29 and 40 in the position shown in Figure 9, preventing motion between elements 11 and 16 until the element 22 is centered, thus avoiding incidental contact between the right hand friction elements. Figure 8 illustrates the parts in a normal or non-engaging position at which time ball 29 is in groove 32 and ball 40 in groove 41. As the element 22 is moved from a clutching position, its initial movement causes the sleeve 16 to be advanced toward the other side of the device (to the right as viewed in Figure 9). The ball 40 arrests motion of the sleeve 16 beyond its neutral position until the ball 29 moves into the recess 32. Further motion of the element 22 toward the right causes the ball 40 to move out of its groove 41 and the friction elements then function as previously described.

While the invention has been described with specific reference to the accompanying drawings, it is not to be limited, save as defined in the appended claims.

I claim as my invention:

1. Relatively rotatable coaxial elements, a clutch member fixed to one of the elements, a clutch member axially fixed but journaled upon the other of the elements, a sleeve slidably but non-rotatably mounted on one of the elements, a third clutch member slidably mounted on the sleeve and movable axially of the members and adapted to engage the said members selectively, a ball check between the third member and the sleeve, means to cause the third clutch member to be connected frictionally to either of the other clutch members during initial movement thereof toward such members, and a ball check between the sleeve and the element upon which it is slidably mounted to prevent incidental engagement of certain of the frictional connecting means upon disengagement of other of the means.

2. Relatively rotatable coaxial elements, a clutch member fixed to one of the elements, a clutch member axially fixed but journaled upon the other of the elements, a sleeve slidably but non-rotatably mounted on one of the elements, a third clutch member slidably mounted on the sleeve and movable axially of the members and adapted to engage the said members selectively, a ball check between the third member and the sleeve, and a ball check between the sleeve and the element upon which it is slidably mounted to prevent incidental engagement of certain of the members upon disengagement of other of the members.

KEITH R. MANVILLE.